US011436046B2

(12) United States Patent
Chen (10) Patent No.: US 11,436,046 B2
(45) Date of Patent: Sep. 6, 2022

(54) ELECTRONIC DEVICE WITH MEMORY PROCESSOR-BASED MULTIPROCESSING ARCHITECTURE AND OPERATION METHOD THEREOF

(71) Applicant: Powerchip Semiconductor Manufacturing Corporation, Hsinchu (TW)

(72) Inventor: Kuan-Chow Chen, Hsinchu (TW)

(73) Assignee: Powerchip Semiconductor Manufacturing Corporation, Hsinchu (TW)

( * ) Notice: Subject to any disclaimer, the term of this patent is extended or adjusted under 35 U.S.C. 154(b) by 305 days.

(21) Appl. No.: 16/503,652

(22) Filed: Jul. 5, 2019

(65) Prior Publication Data

US 2020/0117505 A1    Apr. 16, 2020

Related U.S. Application Data

(60) Provisional application No. 62/744,140, filed on Oct. 11, 2018.

(30) Foreign Application Priority Data

Mar. 26, 2019    (TW) .................................. 108110441

(51) Int. Cl.
*G06F 9/48* (2006.01)
*G06F 9/54* (2006.01)
(Continued)

(52) U.S. Cl.
CPC .......... *G06F 9/4881* (2013.01); *G06F 9/3877* (2013.01); *G06F 9/5038* (2013.01); *G06F 9/542* (2013.01)

(58) Field of Classification Search
CPC .. G06F 15/7821; G06F 9/3877; G06F 9/4881; G06F 9/5027; G06F 9/5038; G06F 9/542
See application file for complete search history.

(56) References Cited

U.S. PATENT DOCUMENTS 9,276,987 B1 *  3/2016  Sirota .................... H04L 67/00
10,073,733 B1    9/2018  Jain et al.
(Continued)

FOREIGN PATENT DOCUMENTS

| CN | 108549696 | 9/2018 |
| JP | 2006031480 | 2/2006 |
| TW | 201637013 | 10/2016 |

OTHER PUBLICATIONS

"Office Action of Japan Counterpart Application", dated Nov. 10, 2020, p. 1-5.

*Primary Examiner* — Jorge A Chu Joy-Davila
(74) *Attorney, Agent, or Firm* — JCIPRNET (57) ABSTRACT

A memory processor-based multiprocessing architecture and an operation method thereof are provided. The memory processor-based multiprocessing architecture includes a main processor and a plurality of memory chips. The memory chips include a plurality of processing units and a plurality of data storage areas. The processing units and the data storage areas are respectively disposed one-to-one in the memory chips. The data storage areas are configured to share a plurality of sub-datasets of a large dataset. The main processor assigns a computing task to one of the processing units of the memory chips, so that the one of the processing units accesses the corresponding data storage area to perform the computing task according to a part of the sub-datasets.

28 Claims, 4 Drawing Sheets

(51) Int. Cl.
*G06F 9/38* (2018.01)
*G06F 9/50* (2006.01)

(56) References Cited

U.S. PATENT DOCUMENTS

| | | | |
|---|---|---|---|
| 2008/0228779 A1* | 9/2008 | Mabuchi | G06F 16/2255 |
| 2015/0046642 A1* | 2/2015 | Lee | G06F 13/14 |
| | | | 711/105 |
| 2017/0168942 A1* | 6/2017 | Bernat | G06F 12/128 |
| 2018/0115496 A1 | 4/2018 | Eckert et al. | |
| 2019/0163493 A1* | 5/2019 | Dubeyko | G06F 9/5005 |
| 2019/0268141 A1* | 8/2019 | Pandurangan | H04L 9/0637 |
| 2020/0195537 A1* | 6/2020 | English | H04L 43/08 |

\* cited by examiner

ELECTRONIC DEVICE WITH MEMORY PROCESSOR-BASED MULTIPROCESSING ARCHITECTURE AND OPERATION METHOD THEREOF

CROSS-REFERENCE TO RELATED APPLICATION

This application claims the priority benefits of U.S. provisional application Ser. No. 62/744,140, filed on Oct. 11, 2018, and Taiwan application serial no. 108110441, filed on Mar. 26, 2019. The entirety of each of the above-mentioned patent applications is hereby incorporated by reference herein and made a part of this specification.

BACKGROUND

Field of the Invention

The invention relates to a processing architecture, and particularly relates to a memory processor-based multiprocessing architecture and an operation method thereof.

Description of Related Art

Along with more and more applications which have characteristics of a large quantity of data and intensive computation, such as neural network computation, Ethereum mining operation or genome sequencing computation, and are developed for various types of large datasets, requirements for processing performance of central processing units (CPUs) have been increased. However, a computing speed of a current processor cannot be effectively enhanced due to limitations in a size of a built-in cache unit, a low cache hit rate and a limit of a memory access time.

Regarding this, a general method of enhancing the computing speed may be sharing and performing computing tasks with high computational complexity by utilizing, for example, a field programmable gate array (FPGA) architecture, an application-specific integrated circuit (ASIC) architecture or a graphics processing unit (GPU) architecture, so as to achieve an effect of accelerated computation. However, the aforementioned methods still cannot overcome the limit of the memory access time, and as the number of the processing circuits is increased, energy consumption thereof is also increased. Accordingly, several embodiments of solutions regarding how to design a processing architecture capable of quickly performing intensive computation on large data are provided below.

SUMMARY

The invention provides a memory processor-based multiprocessing architecture and an operation method thereof capable of efficiently performing multiprocessing on large datasets.

A memory processor-based multiprocessing architecture of the invention includes a main processor and a plurality of memory chips. The main processor includes a data index mechanism. The memory chips are coupled to the main processor. The memory chips include a plurality of processing units and a plurality of data storage areas. The processing units and the data storage areas are respectively disposed one-to-one in the memory chips. The data storage areas are configured to share a plurality of sub-datasets of a large dataset. The main processor assigns a computing task to one of the processing units of the memory chips, so that the one of the processing units accesses the corresponding data storage area to perform the computing task according to a part of the sub-datasets.

In an embodiment of the invention, the main processor includes a data index mechanism. The main processor determines to assign the computing task to the one of the processing units of the memory chips according to the data index mechanism.

In an embodiment of the invention, the main processor further includes a job queue. The main processor sequentially assigns a plurality of computing tasks to at least one of the processing units of the memory chips according to the job queue and the data index mechanism.

In an embodiment of the invention, each of the processing units comprises a task queue, and when the one of the processing units sequentially receives more than one computing tasks, the more than one computing tasks are sequentially queued into the task queue of the one of the processing units, so that the one of the processing units sequentially performs the computing tasks according to the task queue.

In an embodiment of the invention, the one of the processing units searches whether a specific sub-dataset corresponding to the computing task exists in the part of the sub-datasets in the corresponding data storage area, so as to continuously perform the computing task according to the specific sub-dataset.

In an embodiment of the invention, when the one of the processing units successfully performs the computing task, the one of the processing units correspondingly returns a computing result to the main processor so that the main processor continues to assign another computing task.

In an embodiment of the invention, when the one of the processing units fails to successfully perform the computing task, the one of the processing units falls back the computing task to the main processor, and the main processor re-assigns the computing task to the others of the processing units until another one of the processing units successfully performs the computing task.

In an embodiment of the invention, the main processor time-divisionally communicates with the memory chips via a first channel.

In an embodiment of the invention, the processing units respectively access the data storage areas one-to-one via a plurality of second channels, and a bandwidth of each of the second channels is greater than a bandwidth of the first channel.

In an embodiment of the invention, the number of the memory chips is determined according to a data quantity of the large dataset.

In an embodiment of the invention, the main processor is coupled to another plurality of memory chips through a wireless communication manner, a peer-to-peer transmission manner or a slot, so as to selectively assign the computing task to one of the plurality of memory chips and another plurality of memory chips.

In an embodiment of the invention, the processing units and the corresponding data storage areas are respectively disposed one-to-one in the same chip or different chips.

In an embodiment of the invention, the main processor assigns a plurality of computing tasks of a same computing event to the processing units so that the processing units perform the computing tasks according to the assignment.

In an embodiment of the invention, the main processor simultaneously assigns a plurality of computing tasks of a plurality of computing events to the processing units so that the processing units independently perform the computing tasks of the computing events.

In an embodiment of the invention, each of the processing units respectively includes a logical operation unit.

An operation method of a memory processor-based multiprocessing architecture of the invention includes the following steps. A computing task is assigned to one of a plurality of processing units of a plurality of memory chips by a main processor. One of a plurality of corresponding data storage areas is correspondingly accessed by the one of the processing units to fetch a part of a plurality of sub-datasets of a large dataset. The computing task is performed according to the part of the sub-datasets by the one of the processing units.

In an embodiment of the invention, the step of, by the main processor, assigning the computing task to the one of the processing units of the memory chips includes determining to assign the computing task to the one of the processing units of the memory chips according to a data index mechanism by the main processor.

In an embodiment of the invention, the step of, by the main processor, assigning the computing task to the one of the processing units of the memory chips further includes sequentially assigning a plurality of computing tasks to at least one of the processing units of the memory chips according to a job queue and the data index mechanism by the main processor.

In an embodiment of the invention, the operation method further includes when the one of the processing units sequentially receives more than one computing tasks, the more than one computing tasks are sequentially queued into the task queue of the one of the processing units, so that the one of the processing units sequentially performs the computing tasks according to the task queue.

In an embodiment of the invention, the step of, by the one of the processing units, performing the computing task according to the part of the sub-datasets includes, by the one of the processing units, searching whether a specific sub-dataset corresponding to the computing task exists in the part of the sub-datasets in the corresponding data storage area to continuously perform the computing task according to the specific sub-dataset.

In an embodiment of the invention, the step of, by the one of the processing units, performing the computing task according to the part of the sub-datasets included, when the one of the processing units successfully performs the computing task, correspondingly returning a computing result to the main processor by the one of the processing units so that the main processor continues to assign another computing task.

In an embodiment of the invention, the step of, by the one of the processing units, performing the computing task according to the part of the sub-datasets included, when the one of the processing units fails to successfully perform the computing task, falling back the computing task to the main processor by the one of the processing units, and re-assigning the computing task to the others of the processing units by the main processor until another one of the processing units successfully performs the computing task.

In an embodiment of the invention, the main processor time-divisionally communicates with the memory chips via a first channel.

In an embodiment of the invention, the processing units respectively access the data storage areas one-to-one via a plurality of second channels, and a bandwidth of each of the second channels is greater than a bandwidth of the first channel.

In an embodiment of the invention, the number of the memory chips is determined according to a data quantity of the large dataset.

In an embodiment of the invention, the main processor is coupled to another plurality of memory chips through a wireless communication manner, a peer-to-peer transmission manner or a slot, so as to selectively assign the computing task to one of the plurality of memory chips and another plurality of memory chips.

In an embodiment of the invention, the processing units and the corresponding data storage areas are respectively disposed one-to-one in the same chip or different chips.

In an embodiment of the invention, the main processor assigns a plurality of computing tasks of a same computing event to the processing units so that the processing units perform the computing tasks according to the assignment.

In an embodiment of the invention, the main processor simultaneously assigns a plurality of computing tasks of a plurality of computing events to the processing units so that the processing units independently perform the computing tasks of the computing events.

In an embodiment of the invention, each of the processing units respectively includes a logical operation unit.

To sum up, the memory processor-based multiprocessing architecture and the operation method thereof provided by the invention can respectively perform corresponding computing tasks by the processing units of the memory chips, so as to accomplish the efficient multiprocessing operation on the large dataset.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In order to make the invention more comprehensible, embodiments are described below as the examples to show the invention. Moreover, components/steps with same reference numbers represent same or similar parts in the drawings and embodiments.

Figure 1:
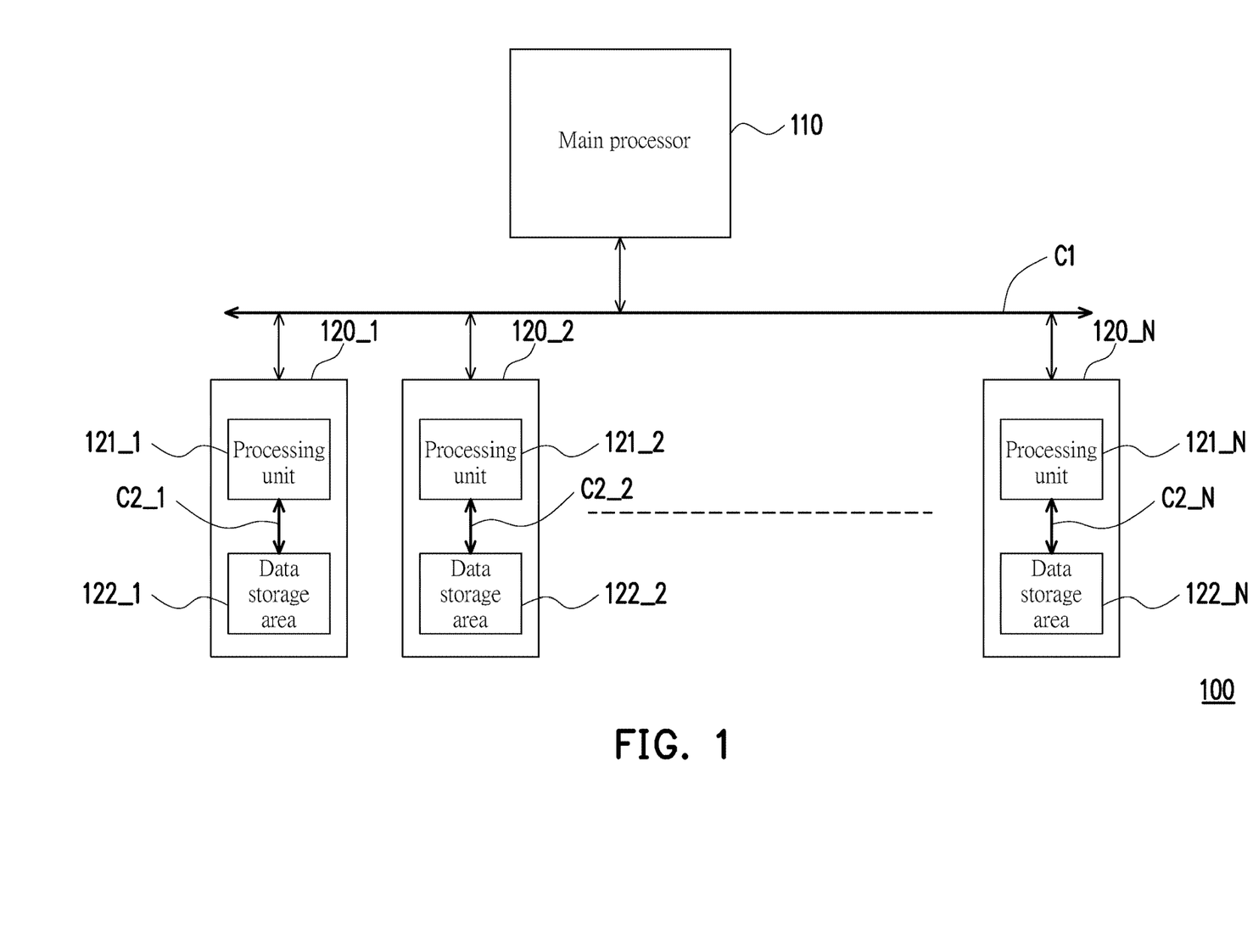
FIG. 1 is a functional block diagram of a multiprocessing architecture according to an embodiment of the invention.

FIG. 1 is a functional block diagram of a multiprocessing architecture according to an embodiment of the invention. Referring to FIG. 1, a multiprocessing architecture 100 includes a main processor 110 and a plurality of memory chips 120_1 to 120_N, wherein N is a positive integer greater than 1. In the present embodiment, the main processor 110 is coupled to the memory chips 120_1 to 120_N via a first channel C1 and time-divisionally communicates with the memory chips 120_1 to 120_N. The memory chips 120_1 to 120_N include a plurality of processing units 121_1 to 121_N and a plurality of data storage areas 122_1 to 122_N. The processing units 121_1 to 121_N and the data storage areas 122_1 to 122_N are respectively disposed one-to-one in the memory chips 120_1 to 120_N. However, in an embodiment, the processing units 121_1 to 121_N and the data storage areas 122_1 to 122_N may also be respectively disposed in different memory chips, and is not limited to the architecture illustrated in FIG. 1.

The processing units 121_1 to 121_N respectively access the data storage areas 122_1 to 122_N one-to-one via a plurality of second channels C2_1 to C2_N. The first channel C1 and the second channels C2_1 to C2_N may be memory buses, and a bandwidth of each of the second channels C2_1 to C2_N is greater than a bandwidth of the first channel C1. In the present embodiment, the bandwidth of each of the second channels C2_1 to C2_N may be 1024 bits, but the invention is not limited thereto. In an embodiment, the bandwidths of the first channel C1 and the second channels C2_1 to C2_N may be correspondingly designed according to data transmission requirements for the multi-processing architecture 100 or data storage formats of the data storage areas 122_1 to 122_N. In other words, the processing units 121_1 to 121_N of the present embodiment do not have to share the same channel, but may independently perform a data reading operation via the dedicated second channels C2_1 to C2_N having the greater bandwidth.

The processing units 121_1 to 121_N may have a processing in memory (PIM) architecture formed by circuit components, such as logic control units, logic operation units and cache units and may perform simple mathematical calculation or complex program computation. The processing units 121_1 to 121_N are respectively integrated in peripheral circuit areas of the memory chips 120_1 to 120_N, so that the data storage areas 122_1 to 122_N are respectively accessed directly with dedicated memory controllers and the dedicated second channels C2_1 to C2_N. In addition, the processing units 121_1 to 121_N may be designed in advance to perform specific computation, for example, neural network computation, Ethereum mining operation or genome sequencing computation, but the invention is not limited thereto.

Additionally, in an embodiment, the main processor 110 may also be coupled to another plurality of memory chips through a wireless communication manner, a peer-to-peer transmission manner or a slot, so as to selectively assign the computing task to one of the plurality of memory chips 120_1 to 120_N and another plurality of memory chips. In other words, the multiprocessing architecture of this embodiment has a characteristic of flexibly increasing computing objects.

The data storage areas 122_1 to 122_N are configured to share a plurality of sub-datasets of a large dataset. In addition, each of the memory chips 120_1 to 120_N of the present embodiment may be a dynamic random access memory (DRAM) chip or a chip based on the architecture of the DRAM chip, but the invention is not limited thereto. Thus, each of the data storage areas 122_1 to 122_N includes a plurality of memory banks, the sub-datasets of the large dataset are dispersedly stored in the memory banks. In an embodiment, the number of the memory chips 120_1 to 120_N may be determined according to a data quantity of the large dataset.

Specifically, when the main processor 110 assigns a computing task of a computing event to one of the processing units 121_1 to 121_N of the memory chips 120_1 to 120_N, the one of the processing units 121_1 to 121_N receiving the computing task accesses a corresponding one of the data storage areas 122_1 to 122_N to fetch a part of the sub-datasets stored in the corresponding data storage area. Meanwhile, the one of the processing units 121_1 to 121_N receiving the computing task performs the computing task according to the part of the sub-datasets. Thus, the multiprocessing architecture 100 of the present embodiment may respectively perform the computing task by each of the processing units disposed in the memory chips, so as to perform multiple computing tasks simultaneously. Meanwhile, each of the processing units 121_1 to 121_N of the present embodiment may quickly fetch the specific sub-datasets corresponding to the computing tasks.

In the present embodiment, the processing units 121_1 to 121_N may be configured to perform the same computing event, and thus, the main processor 110 assigns a plurality of computing tasks of the same computing event to the processing units 121_1 to 121_N. However, in an embodiment, the main processor 110 may also assign a plurality of computing tasks of a plurality of computing events to the processing units 121_1 to 121_N of the memory chips 120_1 to 120_N, so that the processing units 121_1 to 121_N independently perform the computing tasks of different computing events.

Figure 2:
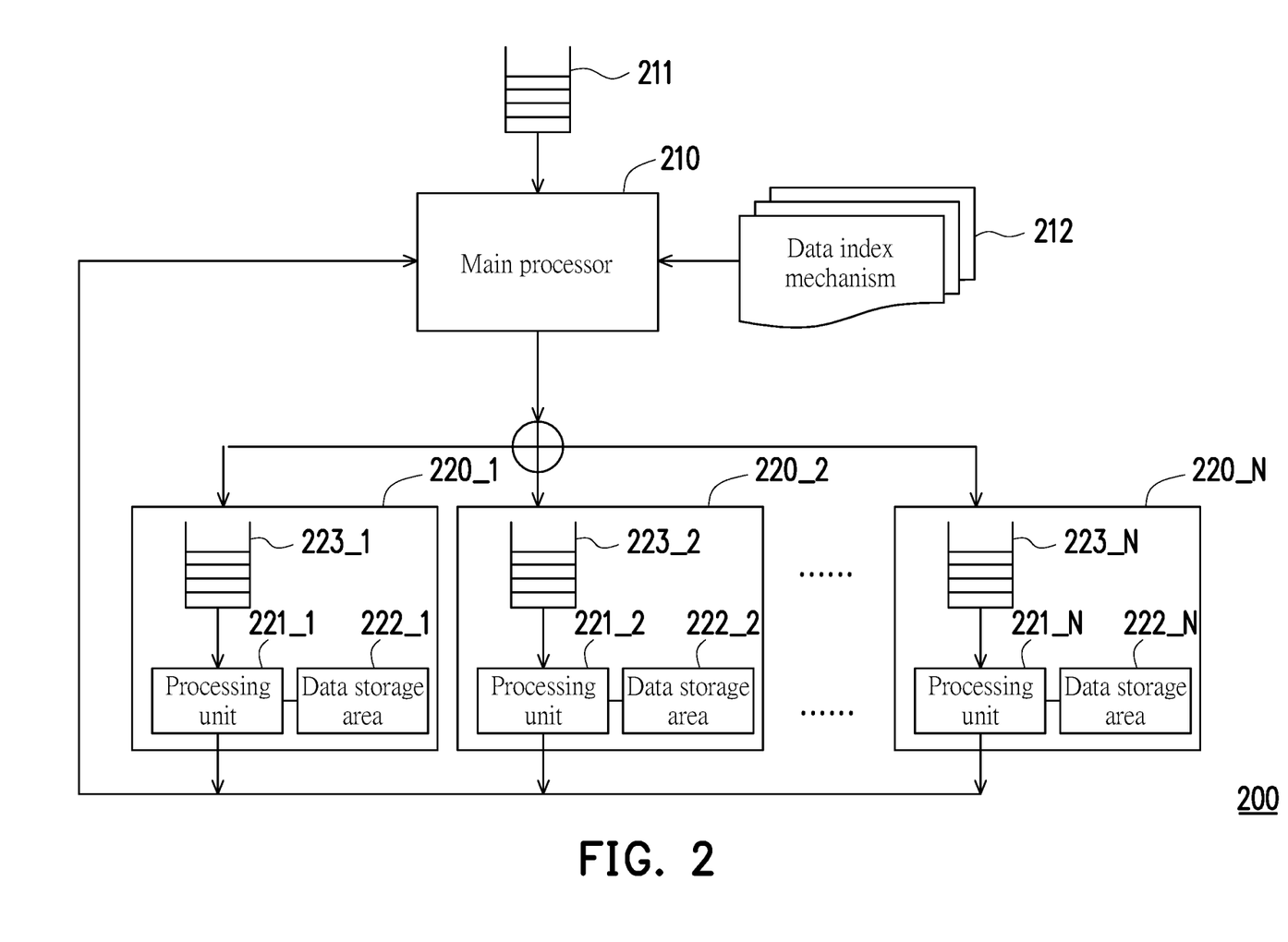
FIG. 2 is a schematic operation diagram of a multiprocessing architecture according to an embodiment of the invention.

FIG. 2 is a schematic operation diagram of a multiprocessing architecture according to an embodiment of the invention. Referring to FIG. 2, a multiprocessing architecture 200 includes a main processor 210 and a plurality of memory chips 220_1 to 220_N. The memory chips 220_1 to 220_N include a plurality of processing units 221_1 to 221_N and a plurality of data storage areas 222_1 to 222_N. The processing units 221_1 to 221_N and the data storage areas 222_1 to 222_N are respectively disposed one-to-one in the memory chips 220_1 to 220_N. Each component of the multiprocessing architecture 200 may be coupled in a manner like that of the multiprocessing architecture 100 illustrated in FIG. 1.

In the present embodiment, the multiprocessing architecture 200 further includes a job queue 211 and a data index mechanism 212. The data index mechanism 212 may be a look up table (LUT), but the invention is not limited thereto. The processing units 221_1 to 221_N further include task queues 223_1 to 223_N. Specifically, when the processor 210 fetches a computing task according to the job queue 211, the main processor 210 determines to assign the computing task to one of the task queues corresponding to one of the memory chips 220_1 to 220_N according to the data index mechanism 212 so that the one of the processing units 221_1 to 221_N performs the computing task according to the corresponding task queue. Meanwhile, the one of the processing units 221_1 to 221_N searches whether a specific sub-dataset corresponding to the computing task is stored in the corresponding data storage area.

If the sub-dataset corresponding to the computing task is stored in the corresponding data storage area, the one of the processing units 221_1 to 221_N performs the computing task according to the sub-dataset corresponding to the computing task. When the one of the processing units 221_1 to 221_N successfully performs the computing task, the one of the processing units 221_1 to 221_N correspondingly returns a computing result to the main processor 210, so that the main processor 210 continues to assign another computing task. Otherwise, after the computing task is performed for several times, if the sub-dataset corresponding to the computing task is not stored in the corresponding data storage area, the one of the processing units 221_1 to 221_N falls back the computing task to the main processor 210, and the main processor 210 sequentially re-assigns the computing task to the others of the processing units 221_1 to 221_N until another one of the processing units 221_1 to 221_N successfully performs the computing task.

Furthermore, in an embodiment, when the job queue 211 includes a plurality of computing tasks, the main processor 210 sequentially assigns the plurality of computing tasks to at least one of the processing units 221_1 to 221_N of the memory chips 220_1 to 220_N according to the job queue 211 and the data index mechanism 212. Additionally, when one of the processing units 221_1 to 221_N sequentially receives more than one computing tasks, the more than one computing tasks are sequentially queued into the task queue of the one of the processing units 221_1 to 221_N, so that the one of the processing units 221_1 to 221_N sequentially performs the more than one computing tasks according to the corresponding task queue.

In an embodiment, it is assumed that the multiprocessing architecture 200 of the present embodiment is applied in the Ethereum mining operation, a plurality of file pages having directed acyclic graph (DAG) files of the large dataset are dispersedly stored in the data storage areas 222_1 to 222_N. Thus, each of the data storage areas 222_1 to 222_N includes a part of the file pages. For example, when the processor 210 fetches a computing task (e.g., a SHA3 operation) corresponding a transaction nonce according to the job queue 211, the main processor 210 determines a corresponding hash code through looking up the data index mechanism 212 and stores it in, for example, the data storage area 222_2. Thus, the main processor 210 assigns the corresponding hash function task (a lookup table operation) to the processing unit 221_2 of the memory chip 220_2. Thus, the processing unit 221_2 performs the corresponding hash function task through reading the data storage area 222_2 to acquire the corresponding hash code (which represents that the mining is successful), and the processing units 221_2 returns a result regarding the successful mining to the main processor 210 to obtain a corresponding reward (i.e., Ethereum coins).

In this example, if the processing unit 221_2 successfully performs the hash function task, the processing units 221_2 correspondingly returns the result regarding the successful mining to the main processor 210, so that the main processor 210 continues to assign another hash function task according to another transaction nonce. Otherwise, if the processing unit 221_2 fails to continue to fetch the hash code in the data storage area 222_2, the processing units 221_2 falls back the hash function task to the main processor 210, and the main processor 210 sequentially re-assigns the hash function task to the others of the processing units 221_1 to 221_N until another one of the processing units 221_1 to 221_N successfully performs the hash function task.

Meanwhile, in this example, when the job queue 211 includes a plurality of hash function tasks corresponding to a plurality of transaction nonces, the main processor 210 sequentially assigns the hash function tasks to at least one of the processing units 221_1 to 221_N of the memory chips 220_1 to 220_N according to the job queue 211 and the data index mechanism 212. Additionally, when one of the processing units 221_1 to 221_N sequentially receives more than one computing tasks, the more than one computing tasks are sequentially queued into the task queue of the one of the processing units 221_1 to 221_N, so that the one of the processing units 221_1 to 221_N sequentially performs the more than one computing tasks according to the corresponding task queue.

In other words, in this example, each of the processing units 221_1 to 221_N may sequentially perform one or more hash function tasks assigned by the main processor 210 according to each corresponding task queue thereof, and each of the processing units 221_1 to 221_N may quickly perform the data reading operation (i.e., a lookup table operation). Thus, each of the processing units 221_1 to 221_N may simultaneously perform a plurality of Ethereum mining operations, so as to increase a speed of successful mining in multiples. In other words, the multiprocessing architecture 200 of the present embodiment may accomplish the processing performance of maximum parallelism by the multiple processing operations of the processing units 221_1 to 221_N.

Figure 3:
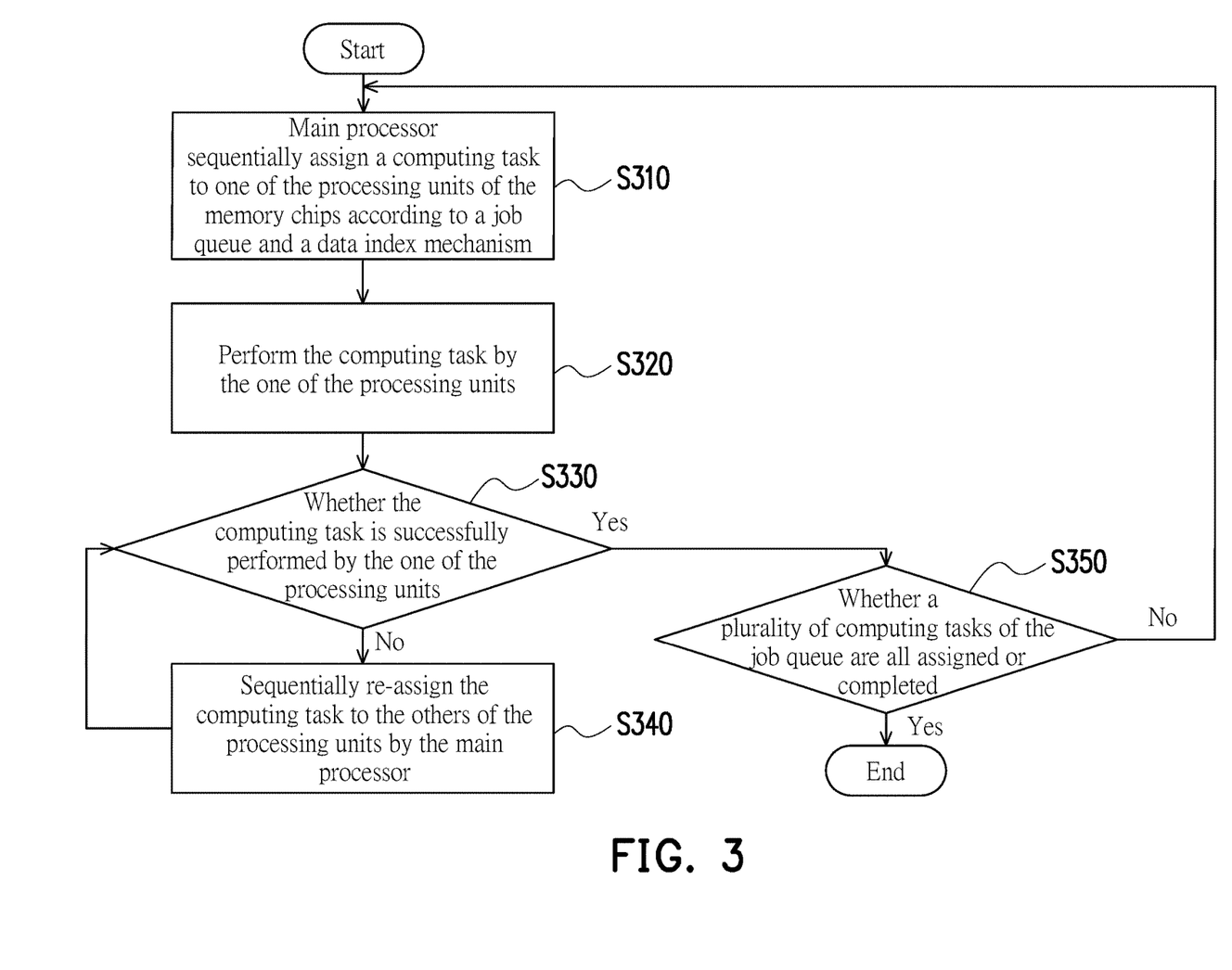
FIG. 3 is a flowchart of an operation method of a multiprocessing architecture according to an embodiment of the invention.

FIG. 3 is a flowchart of an operation method of a multiprocessing architecture according to an embodiment of the invention. Referring to FIG. 3, the operation method of the multiprocessing architecture illustrated in FIG. 3 may be at least applied to the multiprocessing architecture 200 of the embodiment illustrated in FIG. 2. In step S310, the main processor 210 sequentially assigns a computing task to one of the processing units 221_1 to 221_N of the memory chips 220_1 to 220_N according to the job queue 211 and the data index mechanism 212. In step S320, the one of the processing units 221_1 to 221_N which is assigned performs the computing task. In step S330, the one of the processing units 221_1 to 221_N which is assigned determines whether the computing task is successfully performed. If not, in step S340, the one of the processing units 221_1 to 221_N which is assigned falls back the computing task to the main processor 210, and the main processor 210 sequentially re-assigns the computing task to the others of the processing units 221_1 to 221_N. Steps S330 and S340 are performed in a looping manner until the computing task is successfully performed by another one of the processing units 221_1 to 221_N.

Otherwise, if yes, in step S350, the one of the processing units 221_1 to 221_N which is assigned returns a computing result to the main processor 210, and the main processor 210 determines whether a plurality of computing tasks of the job queue are all assigned or completed. If not, the main processor 210 re-performs step S310 to continue to assign a next computing task. If yes, the main processor 210 ends the tasks assigning operation. In the same way, the main processor 210 may assign a plurality of computing tasks to the processing units 221_1 to 221_N according to the job queue 211, and steps S310 through S350 are all performed on each of the computing tasks. Accordingly, the operation method of the multiprocessing architecture of the present embodiment may effectively perform multiple processing and quickly complete the computing tasks.

In addition, sufficient teaching, suggestion and implementation description related to features, technical details or implementation manners with respect to other circuit components in the multiprocessing architecture 200 of the present embodiment may be inferred with reference to the descriptions related to the embodiments illustrated in FIG. 1 through FIG. 2 and thus, will not be repeated.

Figure 4:
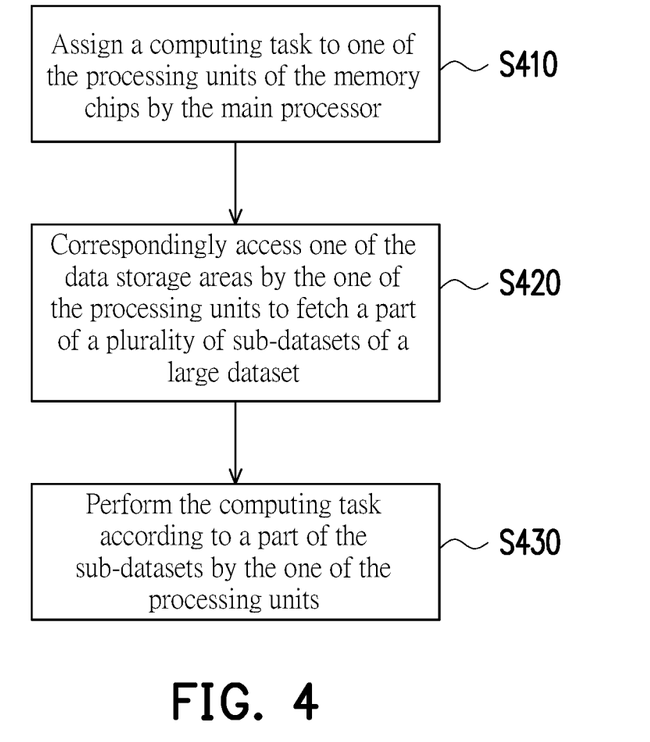
FIG. 4 is a flowchart of an operation method of a multiprocessing architecture according to another embodiment of the invention.

FIG. 4 is a flowchart of an operation method of a multiprocessing architecture according to another embodiment of the invention. Referring to FIG. 4, the operation method of the multiprocessing architecture illustrated in FIG. 4 may be at least applied to the multiprocessing architecture 100 of the embodiment illustrated in FIG. 1. In step S410, the main processor 110 assigns a computing task to one of the processing units 121_1 to 121_N of the memory chips 120_1 to 120_N. In step S420, the one of the processing units 121_1 to 121_N correspondingly accesses one of the data storage areas 122_1 to 122_N to fetch a part of a plurality of sub-datasets of a large dataset. In step S430, the one of the processing units 121_1 to 121_N performs the computing task according to a part of the sub-datasets. Thus, the operation method of the multiprocessing architecture of the present embodiment may effectively and quickly perform the processing in memory (PIM).

In addition, sufficient teaching, suggestion and implementation description related to features, technical details or implementation manners with respect to other circuit components in the multiprocessing architecture 100 of the present embodiment may be inferred with reference to the descriptions related to the embodiments illustrated in FIG. 1 through FIG. 3 and thus, will not be repeated.

Based on the above, the memory processor-based multiprocessing architecture and the operation method thereof provided by the invention can perform the corresponding computing tasks by the processing units of the memory chips and respectively read the data in the corresponding data storage areas through the dedicated buses. Moreover, the number of the memory chips of the multiprocessing architecture of the invention can be correspondingly and arbitrarily increased along with the data quantity of the large dataset. Regarding this, along with the increase of the number of the memory chips, the computation capability of the multiprocessing architecture of the invention is also increase in the same way. Thus, the memory processor-based multiprocessing architecture and the operation method thereof provided by the invention can effectively accomplish the multiple processing operation and quickly perform the large dataset computation. Moreover, the multiprocessing architecture of the invention has a feature of expandability and scalability.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A memory processor-based multiprocessing architecture, comprising:
a main processor, comprising a data index mechanism and a job queue; and
a plurality of memory chips, coupled to the main processor and comprising a plurality of processing units and a plurality of data storage areas, wherein the processing units and the data storage areas are respectively disposed one-to-one in the memory chips, the data storage areas are configured to share a plurality of sub-datasets of a large dataset,
wherein the main processor fetches a computing task corresponding a transaction nonce from the job queue, and the main processor determines that a corresponding hash code is stored in one of the data storage areas of the memory chips through looking up the data index mechanism according to the transaction nonce so as to assign the computing task to one of the processing units of the memory chips corresponding to the one of the data storage areas storing the corresponding hash code according to the data index mechanism, so that the one of the processing units accesses the corresponding data storage area to perform a corresponding hash algorithm of the computing task to obtain the corresponding hash code according to a part of the sub-datasets,
wherein the processing units respectively have a processing in memory architecture, and the data index mechanism is a lookup table.

2. The multiprocessing architecture according to claim 1, wherein the main processor sequentially assigns a plurality of computing tasks to at least one of the processing units of the memory chips according to the job queue and the data index mechanism.

3. The multiprocessing architecture according to claim 2, wherein each of the processing units comprises a task queue, and when the one of the processing units sequentially receives more than one computing tasks, the more than one computing tasks are sequentially queued into the task queue of the one of the processing units, so that the one of the processing units sequentially performs the computing tasks according to the task queue.

4. The multiprocessing architecture according to claim 1, wherein the one of the processing units searches whether a specific sub-dataset corresponding to the computing task exists in the part of the sub-datasets in the corresponding data storage area, so as to continuously perform the computing task according to the specific sub-dataset.

5. The multiprocessing architecture according to claim 1, wherein when the one of the processing units successfully performs the computing task, the one of the processing units correspondingly returns a computing result to the main processor so that the main processor continues to assign another computing task.

6. The multiprocessing architecture according to claim 1, wherein when the one of the processing units fails to successfully perform the computing task, the one of the processing units falls back the computing task to the main processor, and the main processor re-assigns the computing task to the others of the processing units until another one of the processing units successfully performs the computing task.

7. The multiprocessing architecture according to claim 1, wherein the main processor time-divisionally communicates with the memory chips via a first channel.

8. The multiprocessing architecture according to claim 7, wherein the processing units respectively access the data storage areas one-to-one via a plurality of second channels, and a bandwidth of each of the second channels is greater than a bandwidth of the first channel.

9. The multiprocessing architecture according to claim 1, wherein the number of the memory chips is determined according to a data quantity of the large dataset.

10. The multiprocessing architecture according to claim 1, wherein the main processor is coupled to another plurality of memory chips through a wireless communication manner, a peer-to-peer transmission manner or a slot, so as to selectively assign the computing task to one of the plurality of memory chips and another plurality of memory chips.

11. The multiprocessing architecture according to claim 1, wherein the processing units and the corresponding data storage areas are respectively disposed one-to-one in the same memory chip or different memory chips.

12. The multiprocessing architecture according to claim 1, wherein the main processor assigns a plurality of computing tasks of a same computing event to the processing units so that the processing units perform the computing tasks according to the assignment.

13. The multiprocessing architecture according to claim 1, wherein the main processor simultaneously assigns a plurality of computing tasks of a plurality of computing events to the processing units so that the processing units independently perform the computing tasks of the computing events.

14. The multiprocessing architecture according to claim 1, wherein each of the processing units respectively comprises a logical operation unit.

15. An operation method of a memory processor-based multiprocessing architecture, comprising:
by a main processor, assigning a computing task corresponding a transaction nonce to one of a plurality of processing units of a plurality of memory chips;
by the one of the processing units, correspondingly accessing one of a plurality of data storage areas to fetch a part of a plurality of sub-datasets of a large dataset; and
by the one of the processing units, performing a corresponding hash algorithm of the computing task to obtain a corresponding hash code according to the part of the sub-datasets,
wherein the step of, by the main processor, assigning the computing task to the one of the processing units of the memory chips comprises:
by the main processor, determining to fetch the computing task from a job queue, and determining that the corresponding hash code is stored in one of the data storage areas of the memory chips through looking up the data index mechanism according to the transaction nonce so as to assign the computing task to the one of the processing units of the memory chips corresponding to the one of the data storage areas storing the corresponding hash code according to a data index mechanism,
wherein the processing units respectively have a processing in memory architecture, and the data index mechanism is a lookup table.

16. The operation method according to claim 15, wherein the step of, by the main processor, assigning the computing task to the one of the processing units of the memory chips further comprises:
by the main processor, sequentially assigning a plurality of computing tasks to at least one of the processing units of the memory chips according to the job queue and the data index mechanism.

17. The operating method according to the claim 16, further comprising:
when the one of the processing units sequentially receives more than one computing tasks, sequentially queuing the more than one computing tasks into the task queue of the one of the processing units, so that the one of the processing units sequentially performs the computing tasks according to the task queue.

18. The operation method according to claim 15, wherein the step of, by the one of the processing units, performing the computing task according to the part of the sub-datasets comprises:
by the one of the processing units, searching whether a specific sub-dataset corresponding to the computing task exists in the part of the sub-datasets in the corresponding data storage area to continuously perform the computing task according to the specific sub-dataset.

19. The operation method according to claim 15, wherein the step of, by the one of the processing units, performing the computing task according to the part of the sub-datasets comprises:
wherein when the one of the processing units successfully performs the computing task, by the one of the processing units, correspondingly returning a computing result to the main processor so that the main processor continues to assign another computing task.

20. The operation method according to claim 15, wherein the step of, by the one of the processing units, performing the computing task according to the part of the sub-datasets comprises:
wherein when the one of the processing units fails to successfully continue to perform the computing task, by the one of the processing units, falling back the computing task to the main processor; and
by the main processor, sequentially re-assigning the computing task to the others of the processing units until another one of the processing units successfully performs the computing task.

21. The operation method according to claim 15, wherein the main processor time-divisionally communicates with the memory chips via a first channel.

22. The operation method according to claim 21, wherein the processing units respectively access the data storage areas one-to-one via a plurality of second channels, and a bandwidth of each of the second channels is greater than a bandwidth of the first channel.

23. The operation method according to claim 15, wherein the number of the memory chips is determined according to a data quantity of the large dataset.

24. The operation method according to claim 15, wherein the main processor is coupled to another plurality of memory chips through a wireless communication manner, a peer-to-peer transmission manner or a slot, so as to selectively assign the computing task to one of the plurality of memory chips and another plurality of memory chips.

25. The operation method according to claim 15, wherein the processing units and the corresponding data storage areas are respectively disposed one-to-one in the same memory chip or different memory chips.

26. The operation method according to claim 15, wherein the main processor assigns a plurality of computing tasks of a same computing event to the processing units so that the processing units perform the computing tasks according to the assignment.

27. The operation method according to claim 15, wherein the main processor simultaneously assigns a plurality of computing tasks of a plurality of computing events to the processing units so that the processing units independently perform the computing tasks of the computing events.

28. The operation method according to claim 15, wherein each of the processing units respectively comprises a logical operation unit.

* * * * *